United States Patent [19]

Bak et al.

[11] 4,154,911

[45] May 15, 1979

[54] ELASTOMERS WITH IMPROVED METAL ADHESION

[75] Inventors: Eugene Bak, Polk, Pa.; Albert V. Collins, Fairview Park, Ohio; Walter C. Rowe, Fayetteville, Ark.

[73] Assignee: Mooney Chemicals, Inc., Cleveland, Ohio

[21] Appl. No.: 914,400

[22] Filed: Jun. 12, 1978

[51] Int. Cl.² .............................................. C08K 5/56
[52] U.S. Cl. ................... 526/4; 156/110 A; 428/462
[58] Field of Search .............. 526/4; 156/110 A, 124; 428/462

[56] References Cited

U.S. PATENT DOCUMENTS

| | | | |
|---|---|---|---|
| 3,514,370 | 5/1970 | Canevari | 526/4 |
| 3,687,881 | 8/1972 | Bowman | 526/4 |
| 3,887,749 | 6/1975 | Dullum et al. | 156/110 |
| 3,897,583 | 7/1975 | Bellamy | 428/462 |
| 3,905,947 | 9/1975 | Cowell et al. | 526/4 |
| 4,057,529 | 11/1977 | Leo et al. | 156/110 A |
| 4,082,909 | 4/1978 | Sugiyama et al. | 526/4 |

*Primary Examiner*—Willam E. Schulz
*Attorney, Agent, or Firm*—Maky, Renner, Otto & Boisselle

[57] ABSTRACT

Vulcanizable elastomeric compositions are described which comprise an elastomer and from about 0.001 to about 0.1 lb mole of metal per 100 lbs of elastomer, the metal content comprising a mixture of copper and zinc, said metals being present as (a) an organic carboxylic acid salt consisting of copper and zinc combined with one or more carboxylic acids, (b) a combination of two or more copper and zinc salts of organic carboxylic acids, or (c) a combination of a metal salt of an organic carboxylic acid and a mixed organic acid salt complex.

Such vulcanizable elastomeric compositions exhibit improved adhesion to brass plated metal surfaces and are, therefore, useful in preparing rubber laminates containing metal reinforcing elements.

21 Claims, No Drawings

ELASTOMERS WITH IMPROVED METAL ADHESION

BACKGROUND OF THE INVENTION

This invention relates to new vulcanizable elastomeric compositions, and more particularly, to a method of providing a strong and durable bond between a vulcanizable elastomeric composition and a brass plated metal surface. The invention also relates to the laminates and rubber coated metal objects thus obtained.

In the production of rubber articles, such as pneumatic tires, belts, conveyor belts which contain reinforcing metallic elements, tubes provided with reinforcing cords or wires, and, in general, in the production of all rubber articles in which the rubber is reinforced with or bonded to a metal, it is necessary to obtain a strong and durable bond between the metal and the elastomeric composition in order to insure a long life for the articles produced.

In tires, for example, maximum reinforcement of the rubber is obtained when the maximum adhesion is produced between the laminate of rubber and the reinforcing element to form a unitary structure.

Considerable research has been conducted by those involved in the rubber industry toward achieving satisfactory rubber-to-metal bonding. The search for a strong and durable bond has continued over the years in view of the increasing demands placed on steel reinforced rubber as used in automobile and truck tires because of the use of such tires at higher speeds and higher loads. Various proposals have been made in the prior art of additives for rubbers which result in improved bonding between the rubbers and metal. For example, U.S. Pat. No. 2,720,479 describes a system wherein a phenolic resin and a brominated isoolefin-polyolefin interpolymer are dissolved in a suitable liquid carrier and the resulting adhesive composition is spread on the rubber which is to be bonded to the metal. The rubber and metal are subsequently pressed together and vulcanized.

U.S. Pat. No. 3,517,722 to Endter et al describes a rubber-metal adhesion system which involves formation of a resorcinol-formaldehyde resin at the interface between the rubber and the metal, thereby bonding these materials together. Upon vulcanization, methylene and resorcinol are released and presumably react to form the resorcinol-formaldehyde resin. In U.S. Pat. Nos. 3,256,137 and 3,266,970, resorcinol-aldehyde condensation products have been suggested along with certain methylene donors to promote adhesion of rubber to textiles.

More recently, it was suggested in U.S. Pat. No. 3,847,727, that the adhesion of rubber to metal such as wire cord is improved by incorporating a halogenated quinone (e.g., chloranil) and a resorcinol-aldehyde condensate into the rubber. Another resorcinol-formaldehyde resin based additive system is described in U.S. Pat. No. 3,862,883. The adhesive system of this patent utilizes a halogen-donating material such as a halogenated hydantoin in combination with the resorcinol-formaldehyde resin.

The use of organo-nickel salts as adhesion promotors in vulcanizable elastomers is suggested in U.S. Pat. No. 3,991,130. The nickel is present in a free valent state or in a metal complex associated with an organic ligand and certain specified anions.

The use of other metal organic salts such as the metal salts of organo carboxylic acids have been suggested in several patents. For example, U.S. Pat. No. 3,897,583 suggests that the adhesion of rubber to metal is improved by incorporating a cobalt salt such as cobalt naphthenate into a rubber stock which contains an adhesive resin forming system comprising a methylene donor and a resorcinol type methylene acceptor. Japanese Pat. No. 49-17661, published May 2, 1974, describes the use of zirconium compounds such as zirconium oxide, zirconium carbonate, zirconium octylate, zirconium stearate and zirconium tall oil fatty acid salt for improving the adhesion of steel cord to rubber. In the tests reported in the Japanese patent, the zirconium compounds improved the adhesion of a vulcanizable rubber composition more than did cobalt naphthenate. Cobalt salts of organic carboxylic acids in combination with sulphur have been suggested in U.S. Pat. No. 3,514,370, and the combination of magnesium compounds capable of donating electrons such as magnesium oxide with a carboxylated cobalt oxy metal complex is suggested in U.S. Pat. No. 4,057,529 as improving rubber to metal adhesion.

As mentioned above, because of the increasing demands placed on the metal reinforced rubbers such as automobile tires, there continues to be a need for improved adhesion of the rubber to metal. Moreover, some of the widely used additives in rubber for promoting the cure rate of the rubbers and improving the adhesion characteristics are the cobalt salts of organic carboxylic acids such as cobalt naphthenate which are quite expensive. Accordingly, there continues to be a need for new and inexpensive rubber additives.

SUMMARY OF THE INVENTION

Vulcanizable elastomeric compositions are described which comprise an elastomer and from about 0.001 to about 0.1 lb mole of metal per 100 lbs of elastomer, the metal content comprising a mixture of copper and zinc, said metals being present as
  (a) an organic carboxylic acid salt consisting of copper and zinc combined with one or more carboxylic acids,
  (b) a combination of two or more copper and zinc salts of organic carboxylic acids, or
  (c) a combination of a metal salt of an organic carboxylic acid and a mixed organic acid salt complex.
Such vulcanizable elastomeric compositions exhibit improved adhesion to brass plated metal surfaces and are, therefore, useful in preparing rubber laminates containing metal reinforcing elements.

DESCRIPTION OF THE PREFERRED EMBODIMENTS

It now has been found that the adhesion of rubber elastomers to brass plated metal can be improved by incorporating into a vulcanizable elastomer a small amount of mixed copper and zinc salts. It also has been found that the improvement in the strength of the bond between the elastomer and the metal is, in most instances, better than the bond strength obtained for the corresponding elastomer wherein only one of said metals is present. The weight ratio of copper to zinc in the mixture generally will be within the range of from about 10:1 to 1:10.

The copper and zinc can be introduced into the elastomer in accordance with this invention as either (a) an organic carboxylic acid salt consisting of copper and zinc combined with one or more carboxylic acids, (b) a combination of two or more copper and zinc salts of organic carboxylic acids, or (c) a combination of a metal salt of an organic carboxylic acid and a mixed organic acid salt complex.

The combinations identified as (b) and (c) above are preferred methods for introducing the desired metals and these combinations are described in detail below.

The organic carboxylic acid salt of copper and zinc (a) which may be utilized to introduce the metals into the vulcanizable elastomers of the invention may be a carboxylic acid salt obtained by reacting an organic carboxylic acid or a mixture of carboxylic acids with a first metal, and thereafter completing the reaction with the second metal. An excess of the metal or metals may be used to form overbased mixed metal carboxylates, in which the chemical equivalents of metal exceed the chemical equivalents of acid or acids present in the compositions. The essential difference between these mixed salts and the combinations of (b) and (c) is that these mixed salts are prepared by a chemical reaction rather than by the blending of reaction products.

One of the preferred combinations of metal salts are those obtained by use of a combination of two or more copper and zinc salts of organic carboxylic acids (b). In one embodiment, the salts are prepared separately and thereafter mixed in the desired proportions prior to addition to the elastomer. For example, a copper naphthenate dispersion in rubber processing oil, and a second dispersion containing, for example, zinc naphthenate is prepared and the two dispersions are mixed to provide a dispersion containing the desired amounts of the two metals.

The preparation of the copper and zinc salts of organic carboxylic acids is well known to those skilled in the art since many of the salts have been used previously as processing aids for elastomers. At times, such salts have been referred to in the art as soaps. The salts or soaps can be prepared as normal or basic salts or soaps by varying the amount of metal reacted with the organic carboxylic acid and by other techniques used in the art to increase the amount of metal reacted with the carboxylic acid which results in overbased products.

The organic carboxylic acids used in the formation of the salts or soaps can be either natural or synthetic, aliphatic or aromatic acids or mixtures thereof. Examples of natural acids, although usually refined, include straight and branched chain carboxylic acids and mixtures such as tall oil acids, cyclic carboxylic acids such as naphthenic acids. A variety of synthetic carboxylic acids, and particularly aliphatic carboxylic acids or mixtures thereof have been produced, and these generally contain six or more carbon atoms.

The metal salts or soaps can be prepared by fusion, precipitation or direct metal reaction methods. The soaps normally are prepared in an inert liquid medium such as a hydrocarbon oil or solvent. The organic carboxylic acids generally will have at least six carbon atoms and as many as 30 carbon atoms but when more than one carboxylic acid is employed, as in (a), carboxylic acids containing as little as two carbon atoms may be employed as one of the acids in the mixture. Examples of useful organic carboxylic acids include acetic acid, propionic acid, butyric acid, isopentanoic acid, 2-ethyl-hexoic acid, isooctanoic acid, isononanoic acid, neodecanoic acid, tall oil acids, stearic acid, palmitic acid, naphthenic acid, etc. The preparation of the normal and basic salts of such organic carboxylic acids is known in the art such as, for example, in U.S. Pat. Nos. 2,251,798; 2,955,949; 3,723,152 and 3,941,606. The basic salts or soaps are preferred since these contain higher amounts of copper and zinc, and those salts and soaps containing exceedingly high metal content, often referred to as "overbased" are particularly useful in the invention. It has been discovered that the copper-zinc mixtures prepared from the overbased copper salts exhibit improved properties on aging.

Specific examples of metal salts of organic carboxylic acids which can be used in combinations in accordance with the present invention are listed in the following Table I.

In component examples S-1 through S-6, the diluent is a rubber process oil. Thus, where the metal salt is prepared in other diluent such as mineral spirits, the mineral spirits are stripped from the salt and replaced by the desired amount of a rubber process oil which in the specific examples is "Flexon 641".

TABLE 1

| Component | Basic Carboxylate Metal Salts | | |
|---|---|---|---|
| | Metal | Metal Content (%) | Acid |
| S-1 | Cu | 16 | neodecanoic |
| S-2 | Cu | 11 | neodecanoic |
| S-3 | Cu | 8 | naphthenic |
| S-4 | Zn | 18 | 2-ethyl hexoic |
| S-5 | Zn | 10 | naphthenic |
| S-6 | Zn | 10 | mixture of $C_8$–$C_{13}$ |

The preparation of the above described metal salts is illustrated by the following examples.

EXAMPLE S-1

A mixture of 260 parts of crude neodecanoic acid, 103 parts of propionic acid, 400 parts of mineral spirits, 172 parts of copper powder, 91 parts of Methyl Cellosolve, 14 parts of dipropylene glycol, 70 parts of water, 10 parts of octylphenoxy polyethoxy ethanol (Triton X-15 from Rohm & Haas Company) and 3 parts of Santoflex-77 is prepared and sparged with air while heating to a temperature of about 80° C. Reaction under these conditions continues for about 6 hours. A small amount of boric acid (7 parts) is added and the heating is continued at 80° C. with air sparging. The reaction is continued at this temperature until 180% acid neutralization is achieved (total, 14 hours). The mixture is heated for an additional 2 hours at a temperature of about 105° C. to 190% acid neutralization. The air blowing is terminated, and an inert nitrogen atmosphere is employed while the mixture is slowly heated to about 150° C. over a period of 8 hours while excess water is removed.

Four approximately equal proportions of amyl phosphate totalling 176 parts are added at 3-hour intervals while maintaining a temperature of about 145° C. and a nitrogen atmosphere. The mixture then is cooled to about 125° C., settled to remove excess copper and filtered.

The filtered product is transferred to a dehydration unit where it is heated under vacuum to a temperature of about 150° C. in order to remove the mineral spirits which is replaced with 303 parts of Flexon 641 oil to adjust the metal content to 16% copper.

The remaining component examples S-2 through S-6 in Table I can be prepared by methods similar to those described above for S-1 or by alternative procedures known in the art. The carboxylate metal salt components may be prepared from commercially available mineral spirits solutions. The procedure involves vacuum stripping the mineral spirits followed by addition of the desired amount of a rubber processing oil or, alternatively, adding the rubber processing oil to the commercially available mineral spirits solutions followed by vacuum stripping of the mineral spirits. The mineral spirits solutions of the copper and zinc salts are available from Mooney Chemicals, Inc., Cleveland, Ohio, 44113 under the general trade designations TEN-CEM, CEM-ALL, NAP-ALL, HEX-CEM, LIN-ALL and NEO-NAP. In mineral spirits, these products are identified as driers.

As another specific example of the carboxylate copper salts in rubber processing oils listed in Table I, component S-2 is prepared from Mooney Chemicals, Inc. CEM-ALL drier based on neodecanoic acid and containing 12% copper. A 12% copper solution in mineral spirits (13.28 parts) is mixed with 2.5 parts of Flexon 641 oil and the mixture is heated under vacuum to remove the mineral spirits. The residue is adjusted with additional processing oil to form component S-2 containing 11% copper. As mentioned, other carboxylate metal salts in rubber processing oils such as those listed in Table I can be prepared from the corresponding mineral spirit solutions in a similar manner.

Mixtures of basic carboxylate copper and zinc salts such as those described in Table I are easily prepared and utilized in accordance with the invention. For example, a mixture in accordance with the invention is prepared from equal parts of components S-1 and S-6 resulting in a mixture containing 8% copper and 5% zinc. A mixture of two parts of component S-1 with one part of component S-6 will contain 10.7% of copper and 3.3% of zinc. Various ratios of copper to zinc can be incorporated into the vulcanizable elastomers of the invention. Generally, the mole ratio of copper to zinc will be in the range of from 10:1 to about 1:10 with the preferred embodiments being from about 2:1 to about 3:1. These copper and zinc salt combinations are included in vulcanizable elastomeric compositions in amounts which are sufficient to improve the adhesion of the vulcanized elastomer to metal, and generally, amounts within a range of from about 0.001 to about 0.1 lbs mole metal per 100 lbs of elastomer will be sufficient. Expressed in terms of moles of metal, the total moles of metal in the elastomer may vary from about 0.001 to about 0.01.

MIXED ORGANIC ACIDS SALT COMPLEXES

The elastomers of the invention can contain mixed organic acid salt complexes which are overbased metal carboxylate/sulfonate complexes. The complexes have a metal-to-acid ratio of greater than 1:1, are soluble in aromatic and hydrocarbon solvents, especially mineral spirits and light oils, and are easily dispersed in vulcanizable elastomers despite the very high copper or zinc content.

These complexes characteristically include, in chemical combination with the copper or zinc, at least two different organic acid moieties selected from unsaturated and, preferably saturated, aliphatic or alicyclic monocarboxylic acids and oil-soluble sulfonic acids. At least a first acid is a monocarboxylic acid moiety, preferably a monobasic aliphatic carboxylic acid containing at least seven carbon atoms. Although there is no critical upper limit on the number of carbon atoms, about 22 carbon atoms is a practical upper limit.

There is no carbon chain restriction on the second acid except that when the second acid is a carboxylic acid, the number of carbon atoms in the longest carbon chain in the second carboxylic acid should differ from the total number of carbons in the first acid by at least two carbon atoms. There is no restriction in carbon chain length imposed on any third organic acid employed as a ligand, nor on any additional acids thus employed. While one or more of the acids may be volatile low molecular weight types, combinations of nonvolatile acids which follow the above rules also may be employed.

The compositions appear from molecular weight determinations to be polymers, which may be designated as metal oxide- or hydrous metal oxide-oxy acylate (i.e., -carboxylate) or -sulfonate complexes, or where moieties of aliphatic ether alcohols are included in the compositions, as metal oxide or hydrous metal oxide-carboxylate-alkoxide complexes. The complexes appear to be higher in molecular weight than the prior art soaps of the same metals.

More particularly, from X-ray diffraction study of solids and solutions, and electron diffraction and microscopy study of solids, it appears that, in solid, solvent-free compositions of the invention, the ultimate particles each comprise a metallo-oxy or metallo-oxy-hydroxy crystallite core, surrounded by an amorphous matrix of organic ligand groups including bound groups attached through ionic and hydrogen bonding to the atoms of the core crystallite especially at its surface, and absorbed unbound organic groups. These complexes may also be termed heterogeneous in respect to such crystalline and non-crystalline structure within the ultimate particles, and as well with respect to the matrix, inasmuch as different organic moieties may be involved.

The particle size distribution peak is relatively narrow. For a particular choice of metal and acids, variation in the metal to acid ratio seems generally to change the proportion of crystallite-cored particles, rather than their size.

The crystal core phase is found to be CuO (triclinic) for specimens containing respectively only copper. Where two distinct metals were used for the preparations, atoms of the second were also found to be present in the core.

When only carboxylic acids or carboxylic acid moiety sources (acids, esters) are used in the preparation, it is believed that the organic moiety or ligand species is present as a soap-like metal carboxylate-hydroxide component, R—$CO_2$—M—OH, where the R group is a carbon chain from the acid and M is the metal. Such components engender soap-like characteristics in these compositions. From infrared investigations, it appears that the organic moiety attachment occurs especially through hydrogen bonding between the hydroxyl on the organic moiety and oxygen atoms on the surface of the crystal core, though ionic bonding to the core atoms appears also to occur. An absorption type equilibrium is established between the core with bound organic species and the unbound organic species which are associated with the core.

The amorphous character of the matrix, resulting from the dissimilarity of the acid moieties, confers high solubility in aromatic and aliphatic hydrocarbons (respectively, e.g., xylene, mineral spirits), and for some compositions, to the extent of solution metal contents exceeding 50% by weight.

A typical crystal of these metal complexes may be represented by the formula, $$[(ML_a)_b (HO-M-R_1)_c (HO-M-R_2)_d]_g;$$

wherein
M is copper or zinc, and each M may represent different metals;
L is an oxygen or a hydroxyl group;
$R_1$ is an organic carboxylate group;
$R_2$ is an organic carboxylate or sulfonate group;
a is from about 1 to 2;
b is greater than 1;
c and d are each greater than zero, and c+d is at least 3; and
f is at least 1.

Ether alcohols or polyols may be used in addition to the acid sources or in place of a part of the $R_2$-containing ligand.

To prepare the overbased metal complexes, a reaction is initiated with heating if necessary between a previously formed, or formed-in-situ, divalent metal carboxylate and a predetermined excess of metal hydroxide formed-in-situ from the metal or its lower oxide in the presence of an oxygen-supplying material such as air. Usually mineral spirits is a convenient diluent or reaction medium. The reaction end point is reached when the soluble metal content of the reaction mass reaches a maximum. Generally there will be little or no unreacted residues at this stage if the reactant amounts are carefully formulated, but any unreacted metallic residues can be removed by filtration.

For elastomer applications, the diluent or reaction medium is removed by distillation or otherwise, and the reaction product is dispersed in rubber processing oils which are well known to those skilled in the elastomer art to provide the desired metal concentrations and ease of handling.

When the metal is in the oxide form, it is slurried with water and with what by ordinary stoichiometric considerations would be a deficiency of organic acids at a selected mole ratio of metal-to-acid. The slurry is agitated and heated under reflux until no further reaction occurs and the "excess" metal oxide has been completely converted to hydroxide. Air is then introduced into the mix which is heated to about 120° C. to 150° C. until substantially all of the water is eliminated and insoluble manganous hydroxide has been solubilized by conversion into the complex. Appearance and metal content analyses indicate when processing can be terminated. Either copper metal or cuprous oxide may be employed to form the copper complex, but in both instances, air is required for oxidation.

The mole ratio of total copper or zinc to total acids which characterizes specific complexes can be found by determining the metal content of the complex and comparing it stoichiometrically to the quantity of reactant acids used in the synthesis of the complex. The metal content can be determined by complexometric titration procedures or other conventional methods.

Various mixtures or formulations of reactant monobasic organic acids may be used to facilitate processing or for collateral reasons. Examples of organic carboxylic acids useful in the invention include propionic acid, butyric acid, 2-ethoxyhexoic acid, commercially available standardized nonanoic acid, neodecanoic acid, oleic acid, stearic acid, naphthenic acid and tall oil acid, and as well other natural and synthetic acids and acid mixtures.

The sulfonic acids include the aliphatic and the aromatic sulfonic acids. They are illustrated by petroleum sulfonic acids or the acids obtained by treating an alkylated aromatic hydrocarbon with a sulfonating agent, e.g., chlorosulfonic acid, sulfur trioxide, oleum, sulfuric acid, or sulfur dioxide and chlorine. The sulfonic acids obtained by sulfonating alkylated benzenes, naphthylenes, phenol, phenol sulfide, or diphenyl oxide are especially useful.

Specific examples of the sulfonic acids are dodecylbenzene sulfonic acid, didodecylbenzene sulfonic acid, dinonylbenzene sulfonic acid, octadecyldiphenyl ether sulfonic acid, bis-cetylphenyl disulfide sulfonic acid, cetoxy-caprylbenzene sulfonic acid, dilauryl beta-naphthalene sulfonic acid, the sulfonic acid derived by the treatment of polyisobutene having a molecular weight of 1500 with chlorosulfonic acid, paraffin wax sulfonic acid, cetyl-cyclopentane sulfonic acid, lauryl-cyclohexane sulfonic acid, and polyethylene (molecular weight of 750) sulfonic acid, etc.

In the initial reaction batch, other materials may be used for various ancillary purposes, for example, to serve as dispersing agents or to produce dispersing agents for other reactants. Polyols or alkoxyalkanols can be added as promoters or to reduce the viscosity of the reaction mixture. Acids such as formic, acetic or hydrochloric acid can be included as promoters.

There may be employed according to conventional practice, viscosity modifiers such as glycols, alcohol ethers or glycol ethers, amines and phosphate esters, but higher metal-to-acid ratios may be attained with use of alcohol- or glycol-ethers. Also anti-oxidants may be employed if desired.

Some ancillary constituents may react and combine with the copper or zinc, but the net effect is not deleterious to the process or ultimate product. For example, alkoxyalkanols of higher molecular weight and boiling ranges may become a combined organic moiety in a final product.

Several examples of the mixed organic acid copper salt complexes are presented below in tabular listings giving for each example: (a) the raw materials and amounts used, (b) for the solution product usually brought to 1,000 gram final batch weight, (i) the weight percent metal content after removal of any unreacted or insoluble metal or oxide, (ii) the total metal-to-total acid molar ratio ("M/A"), (iii) the weight percent conversion of the metal available in the source, and in some examples, (iv) other properties such as percent by weight of non-volatile material ("non-volatiles" or "N.V.") which is the presumed active complex in the solution product; and (c) for the "active component", that is the solid obtained upon removing the diluent or solvent, the metal content by weight percent.

The percentages referred to in the tables and elsewhere are weight percentages, unless otherwise stated. The molar ratio and conversion values are equally pertinent or applicable to the solution product and to the isolated active component, which is found to have a complex constitution, of the nature previously described.

For the raw materials under each example heading, in column "Bt" there are given for each batch component the amount used in grams for a thousand grams of the batch solution product obtained with the designated metal content; and, for certain components in the column "Mols" or "Eq", respectively the gram-mols, or the gram-equivalent based upon apparent molecular weight, as given by chemical analysis. Thus the amounts stated represent the active content of the designated components or, in the case of the "principal" organic acids which are technical or standardized mixtures, the gram-mol or grams-equivalent figure is based upon the determined acid number for the nominal raw material acid.

For ammonium hydroxide, hydrochloric acid and hydrazine hydrate, the amounts stated are weights used respectively of the usual concentrated ammonia, 37% acid and 35% hydrazine water solutions. The mineral spirits used have a boiling range of about 149° to 205° C. The amounts of air given in cubic feet (taken at ambient conditions, without reduction to standard or dry conditions) are the total amounts blown by the time of oxidation completion.

COPPER COMPLEXES C-1 to C-3

In Example C-1 where the metal source is a stoichiometric amount of cuprous oxide, the three-acid batch is heated to and held in the range of 71°–78° C. for 11 hours with continued introduction of air at reflux and further additions of water, though water is formed in the reaction beyond that charged in the batch. The batch is heated to and held at about 150° C. for 4 hours to remove water. Nitrogen is bubbled through the mixture. The product solution is filtered and concentrated to a brown final liquid product of 35.98% copper content with the listed final product properties, and a 57.4% copper content in the solid.

The four-acid batch of Example C-2 by a procedure similar to that of Example C-1, results in a final liquid product containing about 36.3% copper.

The copper complex of Example C-3 is prepared in a similar manner to C-2 except metallic copper is used in lieu of copper oxide.

In these copper complexes, the oxide core of CuO crystallite is triclinic with associated solubilizing amorphous organic material, especially of the metal hydroxyl carboxylate form. Freezing point depression in trichlorobenzene shows an average molecular weight of about 1,000±100, and in carbon tetrachloride by gel permeation chromatography, molecule sizes of 100 to 1,000 Å and larger. In the solid a uniform particle distribution appeared with a core size of about 50 to 100 Å.

TABLE II

| Raw Materials | Ex.C-1 Bt. | Ex.C-1 Moles | Ex.C-2 Bt. | Ex.C-2 Moles | Ex.C-3 Bt. | Ex.C-3 Moles |
|---|---|---|---|---|---|---|
| Neodecanoic Acid | 77 | 0.40 | 72 | 0.40 | 77 | 0.43 |
| Stearic Acid | 29 | 0.10 | 43 | 0.15 | 47 | 0.16 |
| Butyric Acid | 44 | 0.50 | 36 | 0.30 | 30 | 0.33 |
| Amyl Ac. Phosphate | — | — | 30 | 0.15 | 42 | 0.21 |
| Total Organic Acids | 150 | 1.00 | 181 | 1.00 | 196 | 1.13 |
| Mineral Spirits | 1700 | — | 1800 | — | 1987 | — |
| Water | 150 | — | 200 | — | 221 | — |
| Eastazone | 35 | — | — | — | — | — |
| Triethanolamine | 25 | — | 25 | — | — | — |
| NH$_4$OH | 60 | — | 60 | — | 50 | — |
| Amyl Alc. Mix Isom. | 15 | — | 45 | — | 66 | — |
| Metal or Oxide | 470* | 3.28 | 540* | 3.78 | 596 | 4.16 |
| Air-Total Cu. Ft. | 15 | — | 46 | — | — | — |
| *Cu$_2$O Product |  |  |  |  |  |  |
| Metal % | 35.98 |  | 36.3 |  | 40.12 |  |
| M/A Ratio- Moles | — |  | — |  | 5.59 |  |
| Met. Conversion % | — |  | — |  | 76 |  |
| Non-Volatile % | 62.70 |  | 61.20 |  | 69.5 |  |
| Active Component |  |  |  |  |  |  |
| Metal % | 57.4% Cu |  |  |  | 57.7% Cu |  |

As mentioned above, the elastomer additives of the invention contain mixed copper and zinc salts. The copper and zinc may be in the form of (a) an organic carboxylic acid salt of copper and zinc combined with one or more carboxylic acids, (b) a combination of two or more different copper and zinc salts of organic carboxylic acids, or (c) a combination of a metal salt of an organic carboxylic acid and a mixed organic acid salt complex.

An example of combination (b) is a combination of two or more of the basic carboxylate metal salts illustrated earlier as components S-1 through S-6. An example of such combination is copper naphthenate mixed with zinc neodecanoate. The combination of metal salts (c) is prepared for example by mixing any one of the basic zinc salts listed in Table I with any of the complex copper salts identified as C-1 through C-3 in Table II.

The copper and zinc salts used as elastomeric additives in accordance with the method of the invention may be prepared containing various amounts of copper and zinc and are preferably prepared as dispersions or solutions in rubber processing oils. Accordingly, the salt complexes described above in Table II as dispersions in other diluents such as mineral spirits are treated to remove such diluents which are replaced by the desired amount of processing oil. Therefore, in the following examples, the complexes (C-1 through C-3) are identical to the correspondingly identified compounds of Table II except that the diluent is a rubber processing oil, namely, "Flexon 641" available from Exxon Corporation.

Examples of the copper-zinc additives of this invention are given below in Table III. Examples A through L are prepared by mixing the indicated components in the proportions required to provide the indicated mole ratios of copper and zinc.

TABLE III

Elastomer Additive Combinations

| Example | Components | Mole Ratio Copper:Zinc |
|---|---|---|
| A | C-2 + S-6 | 9.7:1 |
| B | C-2 + S-6 | 4:1 |
| C | C-2 + S-6 | 2:1 |

TABLE III-continued

Elastomer Additive Combinations

| Example | Components | Mole Ratio Copper:Zinc |
|---|---|---|
| D | C-2 + S-6 | 1:1 |
| E | C-2 + S-6 | 1.8:1 |
| F | S-2 + S-6 | 1.97:1 |
| G | S-3 + S-4 | 1:4 |
| H | C-1 + S-4 | 2:1 |
| I | C-2 + S-6 | 8.31:1 |
| J | C-2 + S-6 | 7.4:1 |
| K | C-2 + S-6 | 6.5:1 |
| L | C-2 + S-6 | 3.5:1 |

The amount of additive composition incorporated into the vulcanizable elastomeric compositions is an amount which is effective to improve the adhesion of the elastomer to metal. Generally, the amount of additive incorporated into the elastomer will be sufficient to provide about 0.001 to about 0.01 lb. mole of total metal per 100 lbs. of elastomer or when expressed in terms of total moles of metal in the elastomer, from about 0.001 to about 0.01 moles. The mole ratio of Cu to Zn in the mixture may vary from about 10:1 to about 1:10.

Vulcanizable elastomers employed in this invention are any of the highly unsaturated elastomers which may be natural (Hevea) rubber which is essentially a polymer of isoprene, or conjugated diolefin polymer synthetic rubbers or mixtures of any of these including reclaimed rubber. Such conjugated diolefin polymer synthetic rubbers include homopolymers of 1,3-butadienes such as 1,3-butadiene, isoprene, 2,3-dimethyl-1,1-butadiene, copolymers of mixtures thereof, and copolymers of mixtures of one or more of such butadienes with up to about 75% by weight of one or more monoethylenic compounds which contain a $CH_2=C=$ group where in at least one of the unconnected valances is attached to an electronegative group. Examples of such compounds which contain a $CH_2=C=$ group and which are copolymerizable with 1,3-butadiene are aryl olefins such as styrene, vinyl toluene, alpha-methyl styrene, chlorostyrene, dichlorostyrene and vinyl naphthalene; the alpha methylene carboxylic acids and their esters, nitriles and amides such as acrylic acid, methyl acrylate, ethyl acrylate, methyl methacrylate, acrylonitrile, methacrylamide; vinylpyridines such as 2-vinyl-pyridine, 2-methyl-5-vinylpyridine; methyl vinyl ketone and methyl isopropenyl ketone. Typical examples of such rubbers include natural rubber (NR), butadiene-styrene rubber copolymers (SBR), butadiene-acrylonitrile rubbery copolymers (NBR) and the rubbery terpolymer of ethylene, propylene and a copolymerizable non-conjugated diene such as hexadiene, dicyclopentadiene, etc. (EPDM). The rubbers may be solution prepared or emulsion prepared, or otherwise.

The elastomeric stock also may contain conventional compounding and vulcanizing ingredients such as reinforcing agents, carbon black, silica, rubber processing or softening oils, antioxidants, sulfur, zinc oxide and accelerators.

The copper and zinc additive compositions of the invention such as those described in Table III can be incorporated into at least a portion of the vulcanizable elastomeric stock along with the other compounding and vulcanizing ingredients appropriate to the particular rubber article being manufactured. Generally, a masterbatch formulation is prepared on a mill and the copper and zinc additives of the invention are mixed with the masterbatch in the desired proportions. The following examples illustrate the preparation of elastomer compounds in accordance with the method of the invention. The following masterbatch formulation is used in the elastomer examples E-1 through E-10.

| Masterbatch | Parts by Weight |
|---|---|
| NR | 100.0 |
| GPF Black | 65.0 |
| Zinc Oxide | 5.0 |
| Stearic Acid | 1.0 |
| Diphenyl-p-phenylene diamene | 2.0 |
| Hydrocarbon resin | 5.0 |
| Santocure NS | 1.5 |
| Sulphur 80%/Stearic Acid 20% | 6.5 |
| Total | 186 |

Ninety three lbs. of this masterbatch is mixed on a 60 inch mill at approximately 70° C. The total time to mix is about 12 minutes.

For the purpose of the following examples and testing, the elastomeric compositions are prepared to contain the indicated amount of total metal as indicated in Table IV, and the compounding is effected on a size B laboratory Banbury mill with 5 phr of Circosol 4240, a rubber processing oil.

TABLE IV

| Elastomer Compound | Additive of Example | Mole Ratio Cu/Zn | Total Moles Metal |
|---|---|---|---|
| E-1 | A | 9.7 | 0.0075 |
| E-2 | B | 4 | 0.0075 |
| E-3 | C | 2 | 0.0075 |
| E-4 | D | 1 | 0.0075 |
| E-5 | E | 1.8 | 0.0071 |
| E-6 | F | 1.97 | 0.0075 |
| E-7 | I | 8.3 | 0.0071 |
| E-8 | J | 7.4 | 0.0064 |
| E-9 | K | 6.5 | 0.0057 |
| E-10 | L | 3.5 | 0.0043 |

The elastomeric compounds containing the copper and zinc salt additives of the invention are laminated or coated (for example, by calendering, extrusion, etc.) onto a metal reinforcement which may be metal wires, cords, plates or similar reinforcing members. The reinforcement frequently is in the form of a brass plated steel wire such as a wire type fabric which is used as breaker, belt or carcass plies including radial plies or tire bead wire.

The resulting assembly or laminate is fabricated or shaped and cured as in conventional practice appropriate to the specific article being manufactured. The adhesive bond between the elastomer and the metal is developed at elevated temperature during the curing or vulcanizing step.

The following examples demonstrate the metal reinforced laminates of the invention. The reinforcement is a brass plated steel cord: National Standard Tire Wire Cord 7×4×0.175", which is a construction commonly used in the making of the plies of a tire.

The elastomer compounds described in Table IV are formed into adhesion test specimens using the above-described wire and cured at about 150° C. (300° F.) for a period of time as indicated in the following Table V. The test specimens are subjected to the following adhesion tests to determine the strength of the bond between the vulcanized rubber and the wire. The adhesion tests are conducted in accordance with ASTM Test No. D-2229 using a crosshead speed of 2 inches/min. In this test, the force required in pounds to remove a 2-inch piece of the steel wire embedded in the vulcanized rubber block is measured (Instron) and recorded in pounds per inch (PPI). The results of this test (as an average of seven cords) are shown in Table V.

Another criterion for determining the effectiveness of the bond between the vulcanized elastomer and the metal is a visual estimation of the amount of rubber stock left on the wire after it is pulled from the vulcanized rubber block in the manner described above. The amount of rubber remaining on the wire is rated on a scale of from 0 to 10, 0 representing no remaining rubber and 10 representing complete coverage of the wire. The results of these tests on vulcanized elastomer compounds E-5 through E-10 also are summarized in Table V.

In addition to the results of the above tests, Table V also contains an indication of the scorch time (minutes) and optimum cure torque of the elastomer samples of the invention as determined by ASTM test designation D-2084-71T.

TABLE V

| | Elastomer to Metal Bonding | | | |
|---|---|---|---|---|
| Elastomer | Cure Time (Min.) | Scorch Cord Coverage | Adhesion (PPI) | Time (Min.) |
| E-5 | 18 | 10 | 165.4 | 4.6 |
| E-6 | 19 | 6 | 165.2 | 2.7 |
| E-7 | 16 | 9 | 258 | 4.7 |
| E-8 | 20 | 10 | 305 | 5.3 |
| E-9 | 19 | 10+ | 312 | 4.7 |
| E-10 | 15 | 10+ | 284 | 4.5 |
| Control* | 12 | 2 | 178 | 4.2 |

*a cobalt neodecanoate; 16% Co; 0.0075 total moles of cobalt in elastomer.

The results reported in Table V show the excellent adhesion made possible by the invention particularly as evidenced by the increased pull necessary to separate the wire from the rubber in the cured laminate as measured in pounds per inch.

The improved adhesion characteristics on aging of elastomers containing the copper and zinc additives of the invention is demonstrated by allowing some of the test specimens described above to age for about 70 hours at 100° C. prior to subjecting the specimens to the adhesion test and rating the cord coverage as described above. The improvement is summarized in the following Table VI.

TABLE VI

| | Elastomer to Metal Bonding - Aged Samples | | | |
|---|---|---|---|---|
| | Adhesion (PPI) | | Cord Coverage | |
| Elastomer | Initial | Aged | Initial | Aged |
| E-7 | 258 | 198 | 9 10 | 8 |
| E-8 | 305 | 155 | 10 | 9 |
| E-9 | 312 | 245 | 10+ | 10 |
| E-10 | 284 | 207 | 10 + | 10+ |
| Control* | 178 | 130 | 2 | 4 |

*Same as in Table V

The embodiment of the invention in which an exclusive property or privilege is claimed is defined as follows:

1. A vulcanizable elastomeric composition comprising an elastomer and from about 0.001 to 0.01 pound mole of metal per 100 pounds of elastomer, the metal content comprising a mixture of copper and zinc, said metals being present as (a) an organic carboxylic acid salt consisting of copper and zinc combined with one or more carboxylic acids, (b) a combination of two or more copper and zinc salts of organic carboxylic acids, or (c) a combination of a metal salt of an organic carboxylic acid and a mixed organic acid salt complex.

2. The composition of claim 1 wherein the copper and zinc are present as a combination of copper and zinc salts of organic carboxylic acids.

3. The composition of claim 2 wherein the organic carboxylic acids are aliphatic or alicyclic monocarboxylic acids having from six to 20 carbon atoms.

4. The composition of claim 1 wherein the mixed organic acid salt complex comprises an overbased salt complex of a mixture of organic carboxylic acids or a mixture of organic monocarboxylic and sulfonic acids.

5. The composition of claim 4 wherein the mixed organic salt complex consists essentially of a metal oxide and a hydroxyl-metal-carboxylate or -sulfonate complex wherein the metal content is in chemical combination partly with oxygen in a polynuclear metal oxide crystallite core and partly with at least two different monocarboxylic acids or a mixture of one or more monocarboxylic and monosulfonic acids containing at least two carbon atoms as hydroxyl-metal-carboxylate and hydroxyl-metal-sulfonate groups, at least one of the acids being a monocarboxylic acid containing at least seven carbon atoms, and when the second acid is also a monocarboxylic acid, the second acid contains a number of carbon atoms in its longest chain differing by at least two carbon atoms from the total number of carbon atoms in the other, at least a portion of the carboxylate and sulfonate groups being hydrogen bonded to oxygen atoms of the core, and the remainder of the carboxylate and sulfonate groups are unbonded and in equilibrium with the bonded groups, and the ratio of total metal moles to the total moles of organic acid is greater than one.

6. The composition of claim 5 wherein the salt complex is represented by the formula $$[(ML_a)_b (HO-M-R_1)_c (HO-M-R_2)_d]_f$$

wherein

M is copper or zinc and each M may represent different metals

L is an oxygen or a hydroxyl group;

$R_1$ is an organic monocarboxylate group;

$R_2$ is an organic monocarboxylate or monosulfonic group;

a is from about one to two;

b is greater than one;

c and d are each greater than zero, and c+d is at least three; and f is at least one.

7. The composition of claim 1 wherein the mole ratio of copper to zinc in the mixture is from about 10:1 to about 1:10.

8. A method of improving the adhesion between a vulcanizable elastomeric composition and a brass plated metal surface to provide a strong and durable bond comprising the steps of (a) providing an elastomeric vulcanizable composition containing from about 0.001 to about 0.01 pound moles of metal per 100 pounds of elastomer, the metal content comprising a mixture of copper and zinc, said metals being present as (i) an organic carboxylic acid salt consisting of copper and zinc combined with one or more carboxylic acids;
(ii) a combination of two or more copper and zinc salts of organic carboxylic acids, or
(iii) a combination of a metal salt of an organic carboxylic acid and a mixed organic acid salt complex;
(b) contacting the elastomeric composition prepared in step (a) with a metal surface, and
(c) vulcanizing the elastomeric composition while in contact with the metal.

9. The method of claim 8 wherein the copper and zinc are present as a combination of copper and zinc salts of organic carboxylic acids.

10. The method of claim 9 wherein the organic carboxylic acids are aliphatic or alicyclic monocarboxylic acids having from six to 20 carbon atoms.

11. The method of claim 8 wherein the mixed organic acid salt complex comprises an overbased salt complex of a mixture of organic carboxylic acids or a mixture of organic monocarboxylic and sulfonic acids.

12. The method of claim 11 wherein the mixed organic salt complex consists essentially of a metal oxide and a hydroxyl-metal-carboxylate or -sulfonate complex wherein the metal content is in chemical combination partly with oxygen in a polynuclear metal oxide crystallite core and partly with at least two different monocarboxylic acids or a mixture of one or more monocarboxylic and monosulfonic acids containing at least two carbon atoms as hydroxyl-metal-carboxylate and hydroxyl-metal-sulfonate groups, at least one of the acids being a monocarboxylic acid containing at least seven carbon atoms, and when the second acid is also a monocarboxylic acid, the second acid contains a number of carbon atoms in its longest chain differing by at least two carbon atoms from the total number of carbon atoms in the other, at least a portion of the carboxylate and sulfonate groups being hydrogen bonded to oxygen atoms of the core, and the remainder of the carboxylate and sulfonate groups are unbonded and in equilibrium with the bonded groups, and the ratio of total metal moles to the total moles of organic acid is greater than one.

13. The method of claim 12 wherein the salt complex is represented by the formula

$[(ML_a)_b (HO-M-R_1)_c (HO-M-R_2)_d]_f$ wherein
M is copper or zinc and each M may represent different metals;
L is an oxygen or a hydroxyl group;
$R_1$ is an organic monocarboxylate group;
$R_2$ is an organic monocarboxylate or monosulfonate group;
a is from about one to two;
b is greater than one;
c and d are each greater than zero, and c+d is at least three; and
f is at least one.

14. The method of claim 8 wherein the elastomeric composition provided in step (a) contains a combination of a metal carboxylate salt and an overbased mixed organic acid salt complex.

15. The method of claim 8 wherein the mole ratio of copper to zinc in the composition of (a) is from about 10:1 to 1:10.

16. A laminate of a reinforcing element having a metal surface and a vulcanized elastomer composition containing from about 0.001 to about 0.01 pound mole of metal per 100 pounds of elastomer, the metal content comprising a mixture of copper and zinc, said metals being present as
(a) an organic carboxylic acid salt consisting of copper and zinc combined with one or more carboxylic acids,
(b) a combination of copper and zinc salts of organic carboxylic acids, or
(c) a combination of a metal salt of an organic carboxylic acid and a mixed organic acid salt complex.

17. The laminate of claim 16 wherein the reinforcing element is brass coated wire tire cord.

18. The laminate of claim 1 wherein the mole ratio of copper to zinc in the mixture is from about 10:1 to 1:10.

19. The laminate of claim 16 wherein the metal is present as a combination of two or more copper and zinc salts of organic carboxylic acids.

20. The laminate of claim 19 wherein the organic carboxylic acids are aliphatic or alicyclic monocarboxylic acids having from six to 20 carbon atoms.

21. The laminate of claim 16 wherein the mixed organic acid salt complex comprises an overbased salt complex of a mixture of organic carboxylic acids or a mixture of organic monocarboxylic and sulfonic acids.

* * * * *